July 14, 1953  M. PICKERT  2,645,530
INDEPENDENT RELEASE PORTION FOR AIR BRAKE CONTROL VALVES
Filed Dec. 30, 1949  3 Sheets-Sheet 1
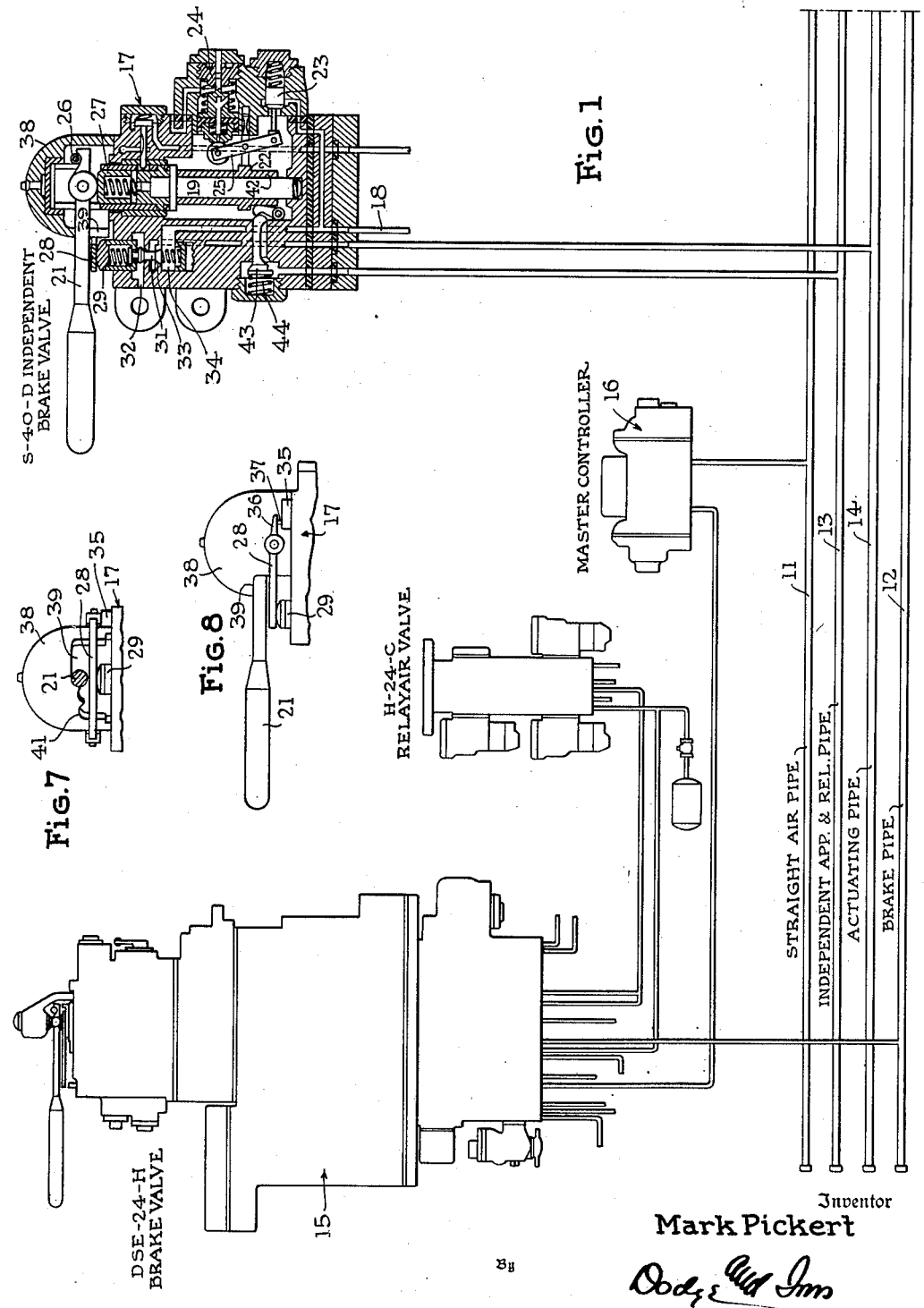
Inventor
Mark Pickert
Attorneys

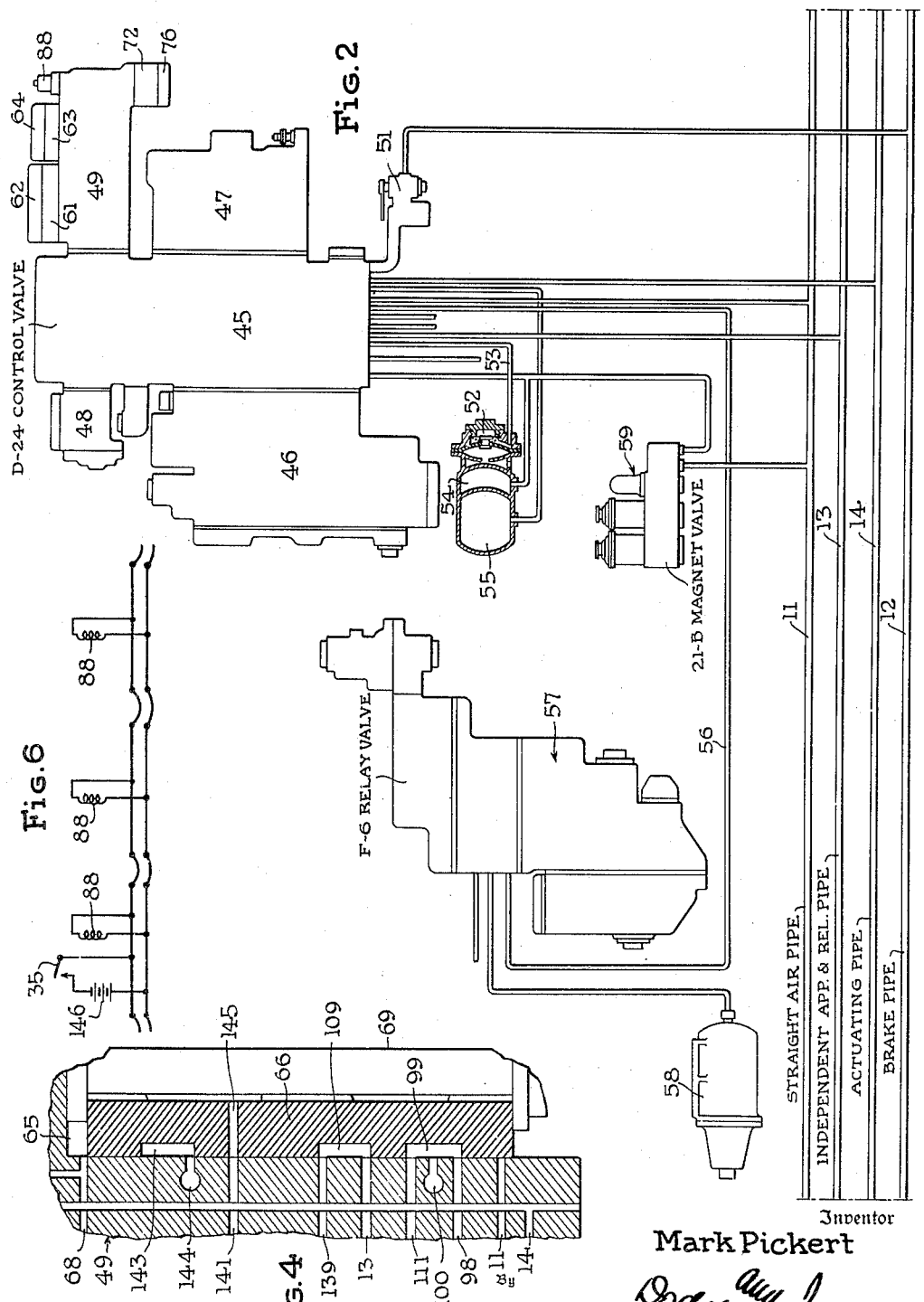

July 14, 1953  M. PICKERT  2,645,530
INDEPENDENT RELEASE PORTION FOR AIR BRAKE CONTROL VALVES
Filed Dec. 30, 1949  3 Sheets-Sheet 3
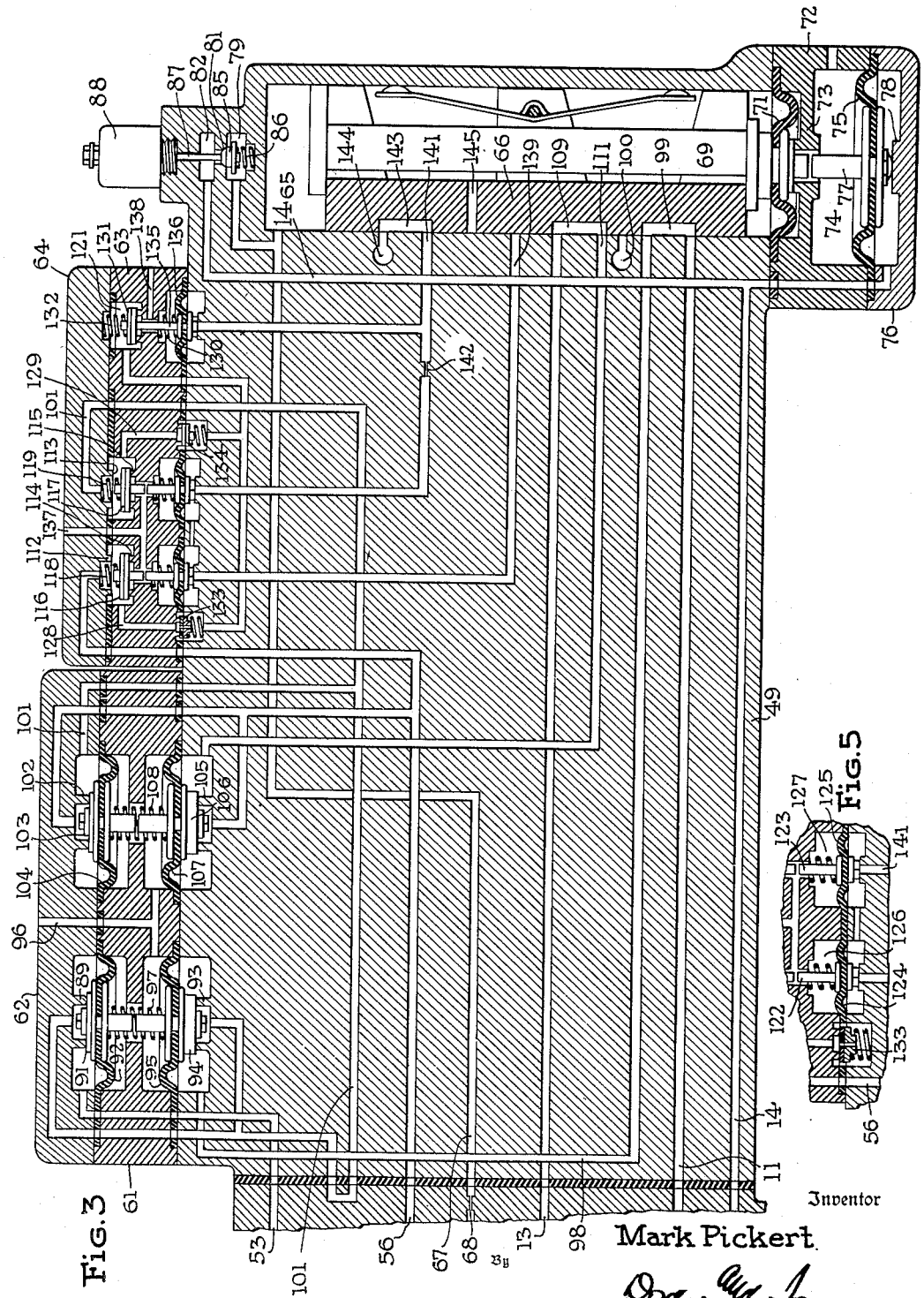
Inventor
Mark Pickert
Attorneys Patented July 14, 1953

2,645,530

UNITED STATES PATENT OFFICE 2,645,530

INDEPENDENT RELEASE PORTION FOR AIR BRAKE CONTROL VALVES

Mark Pickert, Watertown, N. Y., assignor to The New York Air Brake Company, a corporation of New Jersey Application December 30, 1949, Serial No. 135,936

12 Claims. (Cl. 303—26)

This invention relates to air brakes and provides an improved independent application and release portion for use with control valves such as the well-known D-24 control valve.

A brief description of systems using control valves will make it possible to simplify the detailed description of the invention since the more important novel features are in the release portion.

Fundamental elements of any such air brake system are a normally charged automatic brake pipe and a normally vented straight-air pipe each of which extends the entire length of the locomotive and train, a source of compressed air on the locomotive, an engineer's brake valve on the locomotive supplied by said source and capable of being set selectively to control the brake pipe on the automatic principle or control the straight-air pipe on the straight-air principle, and a plurality of control valves, one on each vehicle (including one on each locomotive unit), said valves being connected with both said pipes to be controlled selectively by pressure variations in each. A relay valve on each vehicle directly controls the admission and exhaust of air to and from the brake cylinders on each vehicle.

In automatic applications the control valve establishes pressures in a related displacement volume reservoir and this pressure controls the relay. In straight-air applications pressures developed in the straight-air pipe directly control the same relay. The system commonly includes an electro-pneumatic master controller which accelerates pressure changes throughout the length of the straight-air pipe.

In a simple system, as above outlined, the brakes can be controlled on the automatic basis (and are so controlled in case of need) but straight-air operation is used under normal conditions, the automatic system then standing by as a safety feature, available at any time, and effective to produce an automatic emergency application in case the train breaks in two.

In such a system the brakes on all vehicles would apply and release together. While this is desirable under certain conditions it is also desirable to be able to apply locomotive brakes alone, or apply the train brakes alone or having applied locomotive and train brakes together( on either straight-air or automatic basis) to release the locomotive brakes while the train brakes remain applied. Independent control of locomotive brakes is effected by a so-called independent brake valve on the locomotive and the independent application and release valve portions, one of which is associated with the control valve of each of the locomotive units.

Such arrangements are in commercial use, and the present invention is directed primarily to improvements in the independent application and release valve portions.

The independent brake valve, as commercially constructed can be used. This is a self-lapping valve fed from the main reservoir and controlling pressure in what the art calls the "independent application and release pipe." As a practical matter this is a second straight-air pipe connected only to the application and release portions of the control valves on the various locomotive units.

The commercial independent brake valve (known as the S-40-D) has a vertical stem which is turned about its axis to establish and maintain any desired pressure in the independent application and release pipe. It is operated by a handle which swings in a horizontal plane to operate the self-lapping valve. This handle is hinged on a horizontal axis and may be swung downward from any of its horizontal positions to actuate, through an arcuate bail, another valve device which when actuated by depression of the handle charges a normally vented pipe (called the actuating pipe), leading to the motor piston of the independent application and release portion.

When the handle is up, in its normal plane, the motor is inert and the release slide valve which it actuates moves to a normal or "running" position. When the handle is down, the motor is rendered active and moves the release slide valve to its releasing position.

The S-40-D independent brake valve has a special position in which the handle is latched down, and supply of air to and exhaust of air from the application-and-release pipe are both inhibited. This detail is useful in connection with the invention, as will be explained later.

Everything so far described is known in the art. It is convenient to combine the two handle motions and the two functions in a single valve mechanism and provide the latch-down feature as is done in the S-40-D independent brake valve but, so far as this invention is concerned, such combination is not essential.

The general operative characteristics of a system including the present invention are as follows.

The independent brake valve is normally maintained in release position with the handle up.

If, under these conditions the engineer's brake valve is manipulated to apply the brakes (either by automatic or straight-air operation) both the locomotive and train brakes will apply.

If the independent brake valve handle then be depressed while in its release position, the locomotive brakes will fully release while the train brakes remain applied.

If a partial release of the locomotive brakes is desired while the train brakes remain applied, the independent brake valve handle is first moved to an appropriate partial application position and is then depressed whereupon the locomotive brakes will release for a definite time interval and then lap. Independent release of the locomotive brakes may thereafter be completed by swinging the independent brake valve handle to release position while maintaining it depressed. The partial release above described, though it results from a special manipulation of a standard independent brake valve, is the effect of a novel organization of the independent application and release portion hereinafter described. It depends on pressure relationships between the actuating pipe and the independent application and release pipe. These relationships can be established by a wide variety of valve mechanisms beside the S-40-D valve.

If the handle of the independent brake valve is held depressed in release position, while the engineer's brake valve is manipulated to produce an application, only the train brakes will apply. The same is true if the latched-down position of the S-40-D independent brake valve is in use during making of the application.

The invention affords a greatly improved graduated independent release. It ensures a more nearly simultaneous independent release of brakes on the various locomotive units. In its preferred form it includes a novel accessory electric control which ensures strictly simultaneous independent release of all locomotive units, in situations where an extra electric circuit is acceptable. The device is so contrived that when the independent brake valve handle is carried in latched-down position, an automatic application (but not a straight-air application) will be effective on the locomotive units as well as on the train. This action depends on the supposition that the "latched-down" position inhibits venting of the application-and-release pipe at the independent brake valve, as is the fact when the S-40-D independent brake valve is used.

A preferred embodiment of the invention will now be described by reference to the accompanying drawings in which:

Fig. 1 is a simplified diagram partly in elevation and partly in section of the engineer's brake valve, the independent brake valve and such connections as are related to the invention.

Fig. 2 is a similar diagram of the control valve, the related relay and such connections as are significant in connection with the invention.

Note.—Figs. 1 and 2, when assembled end to end, from left to right, produce a simplified diagram of the brake system for the leading locomotive unit. Each succeeding locomotive unit carries at least the equipment diagrammed in Fig. 2, but it is not deemed necessary merely to duplicate Fig. 2 to illustrate the brake components for the second, third or fourth units.

Fig. 3 is a section through the independent application and release portion, used as a part of the control valve for each locomotive unit. The view is diagrammatic to the extent that all ports are drawn as if they lay in the plane of section. The pilot slide valve is shown in running (normal) position.

Fig. 4 is a fragmentary view similar to a portion of Fig. 3 but showing the pilot slide valve in releasing position.

Fig. 5 is a fragmentary view of a portion of Fig. 3, drawn on a slightly larger scale.

Fig. 6 is a diagram of the electric control circuit.

Fig. 7 is a fragmentary view showing how the handle of the independent brake valve is latched down.

Fig. 8 is a fragmentary view showing the switch associated with the independent brake valve and used in the circuit of Fig. 6 to accelerate the operation of all the pilot valves in the independent release portions on a multiple unit locomotive.

Refer first to Figs. 1 and 2. The pipes which extend from end to end of the train are the straight-air pipe 11 and the automatic brake pipe 12. The pipes which extend from end to end of the locomotive (which commonly would comprise more than one unit and often three or more) are the independent application and release pipe 13 and the actuating pipe 14.

The engineer's brake valve is shown at 15 as of the DSE 24 H type but other usable convertible automatic-straight-air types are available. It is supplied with air by main reservoir connections not specifically identified and is connected directly with the brake pipe 12. It is connected with the straight-air pipe 11 through the master controller 16.

The independent brake valve 17 is supplied with air through connections 18 and is shown as of the S-40-D type. This is a standard self-lapping valve; and requires only general description. The vertical spindle 19 may be turned by a handle 21 and carries a cam 22 which operates the inlet valve assembly 23 and the exhaust valve assembly 24 through a "walking beam" 25. The valve is shown in release position in which it vents pipe 13. As handle 21 is swung to the right the valve establishes and maintains in pipe 13 an increasing pressure, there being a different maintained pressure for each position of the valve.

The handle 21 may be depressed, pivoting about an axis 26 against the upward thrust of spring plunger 27. When depressed it forces an arcuate bail 28 down against the resistance of spring plunger 29 and shifts the spool valve 31 from the exhaust position shown in Fig. 1 to a supply position in which exhaust port 32 is closed and inlet port 33 is open and it delivers air under pressure from supply passage 34 to the actuating pipe 14 through the branch connection clearly shown in the drawing.

A small switch 35 (not a part of the standard S-40-D valve) is mounted as shown in Fig. 8, so that when handle 21 is up, a trigger 36 on bail 28 engages the actuating plunger 37 of the switch and holds the switch open, the switch being biased to close.

As a consequence of the construction described, depression of handle 21 charges the normally vented actuating pipe 14 and closes normally open switch 35.

It is desirable to provide means for latching handle 21 down, so that locomotive brakes will remain released even when the train brakes are applied. For this purpose a guard 38 (see Fig. 7) is mounted on the body of valve 17 and has an open portion 39 which permits the horizontal swinging motion of handle 21 between release and full application positions. It has also a latch-down notch 41 which can be reached only by depressing handle 21 and swinging it to the left beyond release position to latch-down position. In this position the actuating pipe 14 is charged but the independent application and release pipe 13 is not vented at the independent brake valve (as it is in release position). In this one latch-down position a second cam 42 on stem 19 permits valve 43 to close under the urge of spring 44, isolating pipe 13 from valve 17, and establishing the condition above-stated.

If electro-pneumatic control of the pilot valve is not desired, parts 35, 36, 37 can be omitted.

The D-24 control valve here chosen for illustration comprises a pipe bracket 45 to which all pipe connections are made, a service portion 46, an emergency portion 47, a controlled emergency portion 48 and an independent application and release portion 49 which last is used only on locomotive units, and embodies the principal novel features of the present invention.

The brake pipe 12 is connected with the control valve through a cut-out cock and dust collector generally indicated at 51. The brake pipe is normally charged. Reductions of brake pipe pressure at service rates cause service portion 46 to operate and reductions at emergency rates cause both portions 46 and 47 to operate. In respective cases, the displacement reservoir 52 is charged through connection 53 from the auxiliary reservoir 54 or from both the auxiliary reservoir 54 and emergency reservoir 55, depending on whether the application is of the service or emergency type. The resulting pressure is communicated through pipe 56 to relay 57 and operates the relay 57 to establish a related pressure in the brake cylinder typified by the cylinder 58.

The normally vented straight-air pipe 11 is connected through the control valve with the control connection 56 of relay 57. Pressure developed in the straight-air pipe operates relay 57 to develop a related pressure in the brake cylinder 58.

The magnet valve unit 59 has the usual electrical connections (not diagrammed) with the master controller 16 so that in straight-air operations, straight-air pipe pressures vary uniformly throughout the length of the train.

The system so far described conforms to commercial practice (except for parts 35, 36, 37) and is described in detail in Instruction Pamphlet No. 59 published May 1948 by The New York Air Brake Company and entitled "No. 24-RL Brake Equipment." A copy is on file in Division 47 of the U. S. Patent Office.

The independent application and release portion 49 will now be described in detail by reference to Figs. 3-6 inclusive. Certain passages in these figures are in free communication with pipes 11, 13, 14, 53 and 56, and to facilitate description these passages, being mere extensions of said pipes, are identified by the same reference numerals.

The body of the independent application and release portion is indicated in Fig. 3 at 49. This is bolted to the pipe bracket 45 and contains passages which register with corresponding passages in the pipe bracket. Mounted on the housing 49 is the housing 61 of four diaphragm-actuated valves which perform what might be described as switching functions. The top of the housing 61 is closed by a chambered cap 62. A second housing 63, also bolted to the housing 49, contains certain diaphragm-operated valves and check valves hereinafter described. The recessed cap 64 overlies the housing 63 and closes chambers in the upper portion thereof. Gaskets are used to seal joints as is clearly indicated in the drawing but, since the gaskets are conventional, it is deemed unnecessary to apply reference numerals to them.

At the right-hand end of the housing 49 there is a slide valve chamber 65 in which there works the pilot slide-valve 66. The chamber 65 is supplied with air at main reservoir pressure by a passage 67 in which is interposed a restriction 68, designed to limit the rate at which main reservoir air is supplied.

The slide-valve 66 is confined between lugs on a stem 69. The lower end of the stem 69 is sealed to the center of a slack diaphragm 71 whose margin is clamped between the housing 49 and the housing 72. Thus, main reservoir pressure in the chamber 65 acts downward against the flexible diaphragm 71 and biases the valve toward running position, shown in Fig. 3. Running position is defined by collision of a collar on the stem 69 with the annular flange 73 within chamber 74, as shown in Fig. 3.

A second and larger slack diaphragm 75 closes the lower face of the chamber 74 and is sealed to housing 72 at its periphery by a chambered cap 76. A stem 77 is clamped to the center of the slack diaphragm 75 and is in position to engage the lower end of the stem 69 and force it upward until it is arrested by collision with the end of chamber 65. At this point the valve 66 is in releasing position (see Fig. 4). Downward motion of stem 77 is limited by collision with a boss 78 formed within the cap 76. The chamber 74 between diaphragms 71 and 75 is vented to atmosphere, as indicated in the drawing. The chamber below the diaphragm 75 is in direct communication with the passage 14, i. e. with the actuating pipe 14.

When the actuating pipe 14 is vented, the slide-valve 66 moves to running position. When the actuating pipe 14 is under pressure, the diaphragm 75 overpowers the diaphragm 71 and moves the valve 66 to releasing position (Fig. 4) in which it performs functions hereinafter described.

One of the optional features of the invention is the provision for electro-pneumatic control of the valve 66. An extension of the main reservoir port 67 leads to a chamber 79. A valve seat 81 defines a path from the chamber 79 to a chamber 82 immediately above it. Chamber 82 is connected with the actuating passage 14 and consequently with the space below the diaphragm 75. The poppet valve 85 coacts with the valve seat 81 to control flow from chamber 79 to chamber 82 and is biased in a closing direction by the spring 86 as well as by main reservoir pressure in chamber 79. An electrical winding 88 with armature 87 is provided and so arranged that energization of winding 88 will force downward the armature 87 and unseat the valve 85.

As diagrammed in Fig. 6, the normally open switch 35 (see Fig. 8) controls a circuit which includes the current source 146 and all the windings 88 on the locomotive units, the windings 88 being connected in parallel. The arrangement described maintains pneumatic control of the pilot valve 66, such control being exercised through the actuating pipe and passage 14. However, the electrically operated valve 85-88 will greatly accelerate the development of pressure below the diaphragm 75 and this is particularly true as to locomotive units other than the leading unit.

Where the valve 85-88 is provided, and its use is optional, the differential between the areas of the diaphragms 75 and 71 can be minimized without objectionably slowing the shift of the valve 66 from running to releasing position. The reduction of this differential has the effect of accelerating the return motion from releasing position to running position because the diaphragms will then respond to a very moderate reduction of pressure in the actuating pipe and passage 14. Consequently, despite the fact that the electrically actuated valve 85 supplies air only for one direction of shift, a proper proportioning of the parts makes it possible to accelerate both shifts by the use of a single admission valve. This rapid shift is valuable because it makes possible simultaneous releases and also graduated releases on the locomotive units as will be explained in further detail.

Thus, there are two alternative ways of operating the valve 66. One is strictly pneumatic and depends on the existence or absence of pressure in the actuating pipe and passage 14. The other is electro-pneumatic and depends on whether the winding 88 is deenergized or energized. The first arrangement has the advantage of simplicity. The second has the advantage that all the independent release pilot valves will be actuated synchronously and more rapidly.

The two dual valve mechanisms in the housing 61 and cap 62 replace two double seated check valves heretofore used, and perform similar functions. These are, under normal running conditions, to establish selective connections to the control connection 56 of the relay, from the displacement volume reservoir connection 53 or the straight-air pipe 11 or the independent application-and-release pipe 13, according to which of the three is under pressure. Only one of them is under pressure at any one time. The dual valves afford the same paths for release backflows, and close selectively to preclude escape of air through such passages as are vented.

The left-hand dual valve unit comprises an upper valve seat 89, an upper valve 91 and a diaphragm 92, a lower valve seat 93, a lower valve 94 and a lower diaphragm 95. The seats 89 and 93 are presented toward each other so that the valve 91 closes upward and the valve 94 closes downward. The centers of the diaphragms are sealed to respective valves and the margins of the diaphragms are sealed to the housing 61. As indicated, the space between the diaphragms is vented to atmosphere via passage 96. The stems of the valves are nearly in contact so when either is open it holds the other closed. A light spring 97 encircles the stems of the two valves. It does not load them when both are closed, but is then effective to retain both valves substantially in contact with their respective seats.

The passage 53 which is in communication with the displacement volume reservoir 52 leads to the chamber above the upper diaphragm 92 and a passage 98 which, under normal conditions is in communication with the straight-air passage 11, leads to the space below the lower diaphragm 95. Thus, if either of the passages 53 or 98 is under pressure, the corresponding valve 91 or 94 will be unseated, and the other seated.

It may be remarked at this point that the passages 11 and 98 terminate in the seat of valve 66 and are connected by a cavity 99 when the slide-valve 66 is in its running position (Fig. 3). When the valve is in its upper releasing position (Fig. 4), the port 11 is blanked at the seat, and port 98 is vented through cavity 99 and exhaust port 100.

A branched passage 101 leads from the spaces within respective valve seats 89 and 93, so that if either valve 91 or 94 is unseated, a connection is established to the passage 101.

The right-hand diaphragm valve unit in housing 61 is structurally identical with that already described. The upper seat is indicated at 102, the upper valve at 103, and the upper diaphragm at 104. The lower valve seat appears at 105, the lower valve at 106, and the lower diaphragm at 107. The space between the two diaphragms is vented by passage 96 and the two valves are urged substantially into contact with their seats by the light coil compression-spring 108.

A branch of the passage 101 above mentioned leads to the space above the diaphragm 104. The independent application-and-release pipe 13 of Fig. 1 is in communication with the independent application and release passage also numbered 13 which terminates in the seat of the slide-valve 66. When the valve is in its lower (running) position, this is connected by a cavity 109 in the slide-valve with an extension passage 111 which leads from the seat of the slide-valve to the space below the diaphragm 107. Passage 111 as well as passage 98 is connected by cavity 99 with exhaust port 100 when the pilot valve 66 is in exhaust position, Fig. 4.

Branches of the passage 56 lead from the spaces within respective valve seats 102 and 105, so that valves 103 and 106 control connection to the relay valve 57.

The control connection 56 to the relay 57 and the connection 101 which communicates selectively with the displacement volume reservoir 52 and the straight-air pipe 11 are each directly vented as a part of the independent releasing operation. For this purpose extensions of passages 56 and 101 lead respectively to upper valve seats 112 and 113 on the cap 64. Opposed to these seats are respective (lower) exhaust seats 114 and 115 toward which, respectively, double-beat valves 116 and 117 are biased by coil compression springs 118 and 119.

Each of the above valves 116 and 117 may be forced to close against its upper seat (112 or 113) by stems 122 or 123 attached to motor diaphragms 124 or 125 (see Fig. 5). The spaces 126 and 127 between pairs of valve seats are connected by passage 128 and 129 with the space 121 above main exhaust valve 131 which is biased to close by spring 132. Check valves 133 and 134 are interposed in passages 128 and 129 respectively to inhibit cross-flow. Both open in the direction of exhaust flow, both are lightly spring-urged in a closing direction and 133 has a small by-pass port leading through it (see Fig. 5).

A stem 135 attached to motor diaphragm 136 is arranged to unseat valve 131 against the resistance of springs 130 and 132 and the pneumatic pressure which seats the valve. The spaces above all three diaphragms 124, 125 and 136 are vented to atmosphere, the first two through passage 137 and the third through exhaust passage 138.

The spaces below diaphragms 124 and 125 are in free communication with each other. A passage 139 leads from this common space to the seat of pilot slide-valve 66 at such a point that the valve blanks the passage in running position (Fig. 3), whereas in release position (Fig. 4) a cavity 109 connects it with the independent application-and-release passage 13.

A passage 141 leads from the seat of valve 66 to the space below motor diaphragm 136 and through a choke 142 to the connected spaces below diaphragms 124 and 125. In running position (Fig. 3) a cavity 143 connects passage 141 to exhaust port 144. In releasing position (Fig. 4) passage 141 is put under main reservoir pressure by the registration with it of port 145 which extends through valve 66. In releasing position of the pilot valve 66, cavity 99 connects passages 98 and 111 with exhaust port 100.

Operation

An automatic application produced by manipulation of the engineer's brake valve 15 will develop pressure in the connection 53. A straight-air application produced the same way would cause the development of pressure in the passage 11 and consequently also in the passage 98. Depending on which type of application is made, the valve 91 or the valve 94 will open. From there on the flow is by the passage 101 to the space above diaphragm 104.

This opens the valve 103 and flow continues via passage 56 to the relay 57. There is also flow from passages 56 and 101 past the valves 116 and 117 which are then against their lower seats, and thence past respective check valves 133 and 134 to the chamber 121 above the closed local release valve 131.

If the resulting application is released at the engineer's brake valve, the exhaust flows would follow the courses already outlined. Now suppose with the application in effect that it is desired to release the locomotive brakes alone. With the independent brake valve 17 in its release position, the handle 21 is depressed. The effect is to charge the actuating pipe and port 14 and, if the electro-pneumatic valve is used, also to open the valve 85. This causes the pilot slide valve 66 to move to its releasing position shown in Fig. 4. In this position main reservoir air passes through port 145 of the slide valve and develops pressure beneath the diaphragm 136 so that valve 131 is opened and held open.

The coke 142 delays the supply of pressure fluid to the spaces below the motor diaphragms 124 and 125 and since the port 139 is connected to the application-and-release pipe 13, which is vented to atmosphere at the independent brake valve, the locomotive brakes will release completely.

If the engineer wants to release the locomotive application partly, he can do so in one step by manipulation which is not dependent on the presence of the electrically actuated valve 85—88. To make the first step of reduction, the engineer moves the independent brake valve handle 21 to an intermediate application position in which the valve develops a moderate pressure in the independent application-and-release pipe 13. With the valve in this position, he depresses the handle. The first effect is to actuate the diaphragm 136 and start a release but after a time interval, determined by the size of the port 142 and the pressure developed in the port 13, release will be terminated by the rise of the motor diaphragms 124 and 125 and the consequent closure of valves 116 and 117 against their upper seats.

These so-called intercepting valves terminate release. Their operative characteristics can be controlled by choosing the spring load and the size of the port 142. The important point is that the intercepting valves close when there is a moderate pressure in the port 13 and it is not necessary to charge port 13 practically to main reservoir pressure. From this circumstance there follows the fact that the intercepting valves can be caused to close before the brakes are completely released. The brakes can thereafter be completely released by moving the independent brake valve handle 21 to releasing position while holding it depressed.

Locomotive brakes which have been applied on the automatic principle can be released without releasing the other brakes on the train by depressing the handle 21 momentarily while the handle is in release position. A brief depression of the handle will cause electro-pneumatic valve 85—88 to charge the space below diaphragm 75 more quickly than valve 31 can charge the actuating pipe 14, so the brief depression of the handle will cause the valve 66 to move up and return to its running position after a brief interval. This action is dependent on the presence of the electro-pneumatic valve 85—88 but affords a useful graduated release in steps.

If it is desired to hold the locomotive brakes released, the handle is moved to the left from release to locking position. In locking position the application-and-release pipe is closed at the independent brake valve by closure of the valve 43. The port 145 in the pilot slide valve then charges the passage 139 through the choke 142 and since the passage 139 is connected to the independent application-and-release pipe 13 by the cavity 99, sufficient pressure is developed beneath the motor diaphragms 124 and 125 to close both of the intercepting valves 116 and 117. The purpose of this is to prevent the release of an automatic application which might occur as the result of a break-in-two while the handle 21 is in its latched-down position. To prevent the locomotive brakes from applying in unison with the train brakes, the handle 21 is held down while in its release position.

A number of alternatives have been suggested and modifications of details other than those specifically suggested are possible. The particular embodiment chosen for illustration has been described in considerable detail but it should be understood that the embodiment is illustrative and that the scope of the invention is defined solely by the claims.

I claim:

1. An air brake system comprising system means operable on the automatic principle to develop a brake controlling pressure; system means operable on the straight-air principle to develop a brake controlling pressure; manual means operable selectively to actuate either of said system means to develop a controlling pressure; a relay device for applying and releasing brakes and capable of responding to a controlling pressure when so developed; switch valve means responsive to the development of a controlling pressure by either of said system means to subject said relay means to the controlling pressure so developed by that system means and isolate the relay from the other system means; independent manually controlled means for exhausting said controlling pressure; and timed limiting valve means operable to intercept exhaust of said controlling pressure, the last named means being functionally so related to said independent manually controlled means as to be rendered selectively inactive or active by manipulation of the latter, whereby releases effected by said manually controlled means may be caused to be partial or complete.

2. The combination defined in claim 1 in which the timed limiting valve means comprise normally open intercepting valve means arranged in series with said independently controlled exhausting means, a pneumatic motor for closing said intercepting valve means and a metering port for delaying the operation of said motor.

3. In an independent release portion for control valves, the combination of a body having an independent application and release port and an actuating port; a pilot valve and motor shiftable reversely by the development and dissipation of pressure in said actuating port between a running position and a releasing position; a normally closed exhaust valve which when open permits independent release of the brakes; first pressure motor means for opening said exhaust valve; normally open intercepting valve means arranged to control flow through said exhaust; second pressure motor means for closing said intercepting valve means; first port means controlled by said pilot valve and effective in the releasing position thereof to supply pressure fluid at a rapid rate to the first motor means and at a restricted rate to the second motor means; and second port means also effective in said releasing position to connect the second motor means freely with said independent application and release port.

4. The combination defined in claim 3 in which there are two intercepting valves arranged in parallel to control exhaust from two spaced points, and said second motor means is arranged to actuate the two substantially in unison.

5. The combination defined in claim 3 in which there are two intercepting valves arranged in parallel to control exhaust from two spaced points, check valves are interposed in positions to inhibit cross-flows in either direction between said two intercepting valves, and said second motor means is arranged to actuate the two intercepting valves substantially in unison.

6. The combination of the structure defined in claim 3 and an independent brake valve comprising a primary valve mechanism connected to control pressure in said independent application-and-release port, and a secondary valve mechanism operable to charge and vent said actuating port; and a single actuator operable at will to actuate either or both of said primary and secondary valve mechanisms.

7. The combination of the structure defined in claim 3 and an independent brake valve comprising a primary valve mechanism connected to control pressure in said independent application-and-release port, and a secondary valve mechanism operable to charge and vent said actuating port; a single actuator operable at will to actuate either or both of said primary and secondary valve mechanisms, said actuator having a position in which the independent application-and-release port is closed substantially at the independent brake valve and the actuating pipe is charged; and means for releasably retaining said actuator in the last-named position.

8. The combination of the structure defined in claim 3 and electrically operable valve means for accelerating the development of pressure in said actuating port; an independent brake valve comprising a primary valve mechanism connected to control pressure in said independent application-and-release port, and a secondary valve mechanism operable to charge and vent said actuating port and including means to control said electrically operable valve means; and a single actuator operable at will to actuate either or both of said primary and secondary valve mechanisms.

9. The combination of the structure defined in claim 3 and electrically operable valve means for accelerating the development of pressure in said actuating port; an independent brake valve comprising a primary valve mechanism connected to control pressure in said independent application-and-release port, and a secondary valve mechanism operable to charge and vent said actuating port and including means to control said electrically operable valve means; a single actuator operable at will to actuate either or both of said primary and secondary valve mechanisms, said actuator having a position in which the independent application-and-release port is closed substantially at the independent brake valve and the actuating pipe is charged.

10. The combination of the structure defined in claim 3 and electrically operable valve means for accelerating the development of pressure in said actuating port; an independent brake valve comprising a primary valve mechanism connected to control pressure in said independent application-and-release port, and a secondary valve mechanism operable to charge and vent said actuating port and including means to control said electrically operable valve means; a single actuator operable at will to actuate either or both of said primary and secondary valve mechanisms, said actuator having a position in which the independent application-and-release pipe is closed substantially at the independent brake valve and the actuating pipe is charged; and means for releasably retaining said actuator in the last-named position.

11. The combination of a multiple unit locomotive brake system comprising a plurality of control valves each having an independent application and release portion including a pilot valve, a pressure motor for operating the pilot valve and an electrically operated valve adapted to accelerate changes of pressure in said motor; an application-and-release pipe connected to said application and release portions; an actuating pipe connected to said motors; and an independent brake valve connected to both said pipes and capable both selectively and simultaneously of two manipulations, in one of which it varies fluid pressure in the application-and-release pipe, and in the other of which it charges and vents the actuating pipe and controls the operation of said electrically operated valve in harmony therewith.

12. The combination of a multiple unit locomotive brake system comprising a plurality of control valves each having an independent application and release portion including a pilot valve, a pressure motor for operating the pilot valve, and an electrically operated valve adapted to admit pressure fluid to said motor; an application-and-release pipe connected to said application and release portions; an actuating pipe connected to said motors; and an independent brake valve connected to both said pipes and capable both selectively and simultaneously of two manipulations, in one of which it varies fluid pressure in the application-and-release pipe, and in the other of which it charges and vents the actuating pipe and when charging causes said electrically operated valve to open.

MARK PICKERT.

References Cited in the file of this patent

UNITED STATES PATENTS

| Number | Name | Date |
|---|---|---|
| 2,464,977 | Gorman | Mar. 22, 1949 |